United States Patent [19]

Shyh

[11] Patent Number: 5,284,580
[45] Date of Patent: Feb. 8, 1994

[54] REFUSE COLLECTING FRAME FOR SEWER

[76] Inventor: Shyh-Yuan Shyh, 6F, No. 352, Fu Hsing S. Rd., Sec. 1, Taipei, Taiwan

[21] Appl. No.: 924,443

[22] Filed: Aug. 4, 1992

[51] Int. Cl.$^5$ .................... B01D 29/35; B01D 29/37; E03F 5/06; E03C 1/26

[52] U.S. Cl. .................... 210/163; 210/164; 210/232; 210/238; 210/299; 210/307; 210/339; 210/452; 210/497.01; 4/286; 4/289; 52/12; 404/4

[58] Field of Search .............. 210/163, 164, 165, 166, 210/238, 299, 300, 307, 335, 339, 497.01, 452, 232; 404/4, 2; 52/12; 4/286, 289, 292

[56] References Cited

U.S. PATENT DOCUMENTS

| | | | |
|---|---|---|---|
| Re. 31,561 | 4/1984 | Thompson | 4/292 |
| 212,614 | 2/1879 | Magee | 4/289 |
| 414,240 | 11/1889 | Norton | 210/163 |
| 587,559 | 8/1897 | Riley | 4/289 |
| 664,945 | 1/1901 | Guion | 4/289 |
| 674,294 | 5/1901 | Cox | 4/289 |
| 690,838 | 1/1902 | Cox | 4/289 |
| 699,176 | 5/1902 | Hough | 210/163 |
| 774,953 | 11/1904 | Ricker | 4/289 |
| 782,760 | 2/1905 | Javard | 4/291 |
| 852,044 | 4/1907 | Van der Minden | 4/291 |
| 1,014,223 | 1/1912 | Hunsicker | 4/291 |
| 1,035,733 | 8/1912 | Pierce | 4/289 |
| 1,070,773 | 8/1913 | Callahan | 210/164 |
| 1,310,055 | 7/1919 | Caldwell | 210/164 |
| 1,313,153 | 8/1919 | Zboyan | 4/291 |
| 1,333,433 | 3/1920 | Maisano | 4/291 |
| 1,449,300 | 3/1923 | Scott | 4/291 |
| 1,450,629 | 4/1923 | Grigg | 4/291 |
| 1,661,983 | 3/1928 | Wentzel | 4/291 |
| 1,756,290 | 4/1930 | Hibner | 4/289 |
| 1,763,864 | 6/1930 | Robertson | 4/289 |
| 1,798,441 | 3/1931 | Weiss | 4/292 |
| 2,038,852 | 4/1936 | Pasman | 4/291 |
| 2,079,038 | 5/1937 | Ranish | 4/291 |
| 2,095,024 | 10/1937 | Boosey | 210/165 |
| 2,263,259 | 11/1941 | Boosey | 210/164 |
| 2,279,683 | 4/1942 | Judell | 4/288 |
| 2,328,315 | 8/1943 | Warren | 210/165 |
| 2,331,055 | 10/1943 | Smith | 4/291 |
| 2,505,305 | 4/1950 | Schaefer | 4/289 |
| 3,066,802 | 12/1962 | Loffler | 4/292 |
| 3,713,539 | 1/1973 | Thompson | 210/164 |
| 3,815,748 | 6/1974 | Johannessen | 210/163 |
| 3,982,289 | 9/1976 | Robbins | 4/292 |
| 4,092,747 | 6/1978 | Kessel | 4/286 |
| 4,198,717 | 4/1980 | Kessel | 4/286 |
| 4,273,466 | 6/1981 | Trahan | 210/163 |
| 4,301,557 | 11/1981 | Walraven | 4/286 |
| 4,460,462 | 7/1984 | Arneson | 210/163 |
| 4,883,590 | 11/1989 | Papp | 210/164 |
| 5,037,541 | 8/1991 | Ruey-Jang | 210/165 |
| 5,069,781 | 12/1991 | Wilkes | 210/164 |

FOREIGN PATENT DOCUMENTS

| | | | |
|---|---|---|---|
| 562791 | 12/1957 | Belgium | 210/163 |
| 2908549 | 9/1980 | Fed. Rep. of Germany | 210/164 |
| 3002180 | 9/1981 | Fed. Rep. of Germany | 210/163 |
| 3606550 | 9/1987 | Fed. Rep. of Germany | 4/295 |
| 2493372 | 5/1982 | France | 4/292 |
| 8901864 | 2/1991 | Netherlands | 210/164 |
| 596937 | 1/1948 | United Kingdom | 4/292 |
| 1588677 | 4/1981 | United Kingdom | 210/164 |

*Primary Examiner*—Thomas M. Lithgow
*Attorney, Agent, or Firm*—Bacon & Thomas

[57] ABSTRACT

A refuse collecting frame for a drainage sewer, particularly a frame placed beneath a cover of a sewer drainage opening to accumulate refuse and permit easy disposal of refuse accumulated therein in order to prevent blockage of the sewer. The refuse collecting frame includes a frame body and a refuse collecting basin. The frame body is preferably a rectangular or cubic frame structure having a dimension corresponding to the opening of the sewer drain. A filtering net or a porous board with a plurality of penetrating holes is incorporated at each lateral side and bottom of the frame. A plurality of right-angled hangers are formed at spaced positions along the upper edges of an open upper side of the frame for firmly hanging the frame on a sewer opening by positioning the right-angled hangers on a stepped portion formed along edges of the sewer opening beneath a separate cover. A hole of appropriate size is formed at the middle of the filtering net or the porous board at the bottom of the frame body for placing of the collecting basin with a peripheral edge of the basin being supported about the circumference of the hole.

6 Claims, 2 Drawing Sheets

REFUSE COLLECTING FRAME FOR SEWER

BACKGROUND OF THE INVENTION (a) Field of the Invention

The present invention relates to a refuse collecting frame for a sewer, particularly a frame to be placed beneath a manhole of a drainage sewer to collect refuse and ease disposition of the refuse to maintain the draining in good working condition.

(b) Description of the Prior Art

A drainage sewer along a road may be clogged by refuse during the rainy or typhoon season. Accumulation of refuse may severely affect the discharge of water, and even cause flooding. The existing design of a cover for a drainage sewer has a number of holes for passing through of water and to prevent entry of large articles such as bottles, cans, and the like. However, it can not prevent entry of small refuse such as caps of bottles, plastic bags and fabrics, and can't collect small particles such as gravel. Therefore, gravel and other refuse may accumulate at the sewer, and result in blockade of the sewer which could be a cause of flooding.

SUMMARY OF THE INVENTION

The main object of the present invention is to provide a refuse collecting frame for a drainage sewer by providing a frame with a filtering net placed below a sewer cover to collect refuse such as gravel and other articles which can not be filtered out by the holes in the sewer cover.

Another object of the present invention is to provide a refuse collecting frame for a drainage sewer which is placed on the opening of the sewer and supported by hanging on the of the opening so that the frame can be removed easily for fast and easy cleaning and removal of the refuse accumulated to maintain the frame in clean condition.

Another object of the present invention is to provide a refuse collecting frame for a drainage sewer which is placed beneath a cover of a sewer opening to minimize impact thereto by automobiles running over it and to prolong its service life.

DETAILED DESCRIPTION OF THE PREFERRED EMBODIMENTS

Figure 1:
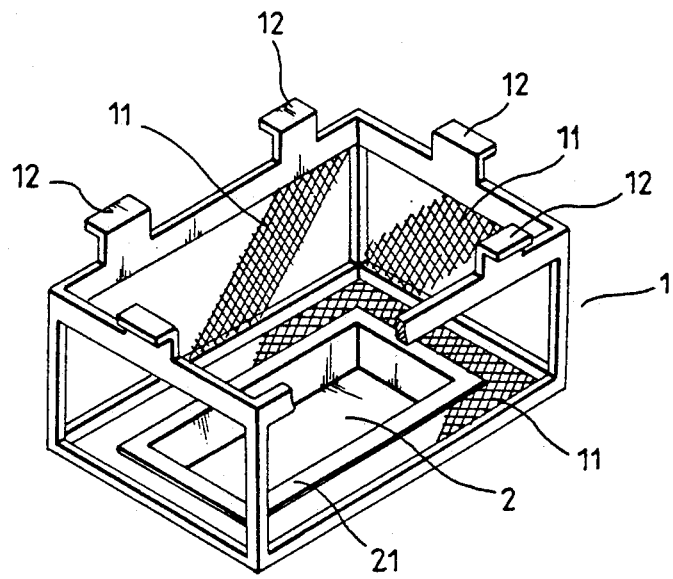
FIG. 1 is a perspective view of a refuse collecting frame for a drainage sewer according to the present invention.
Figure 2:
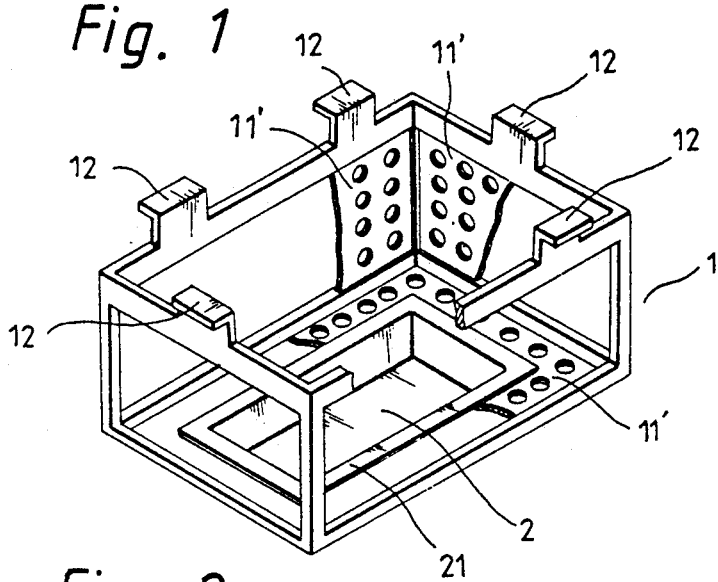
FIG. 2 is a perspective view of another embodiment of the refuse collecting frame for a drainage sewer according to the present invention.

As shown in FIGS. 1 and 2, a refuse collecting frame for a drainage sewer according to the present invention comprises mainly a frame body (1) and an imperforate collecting basin (2).

Figure 3:
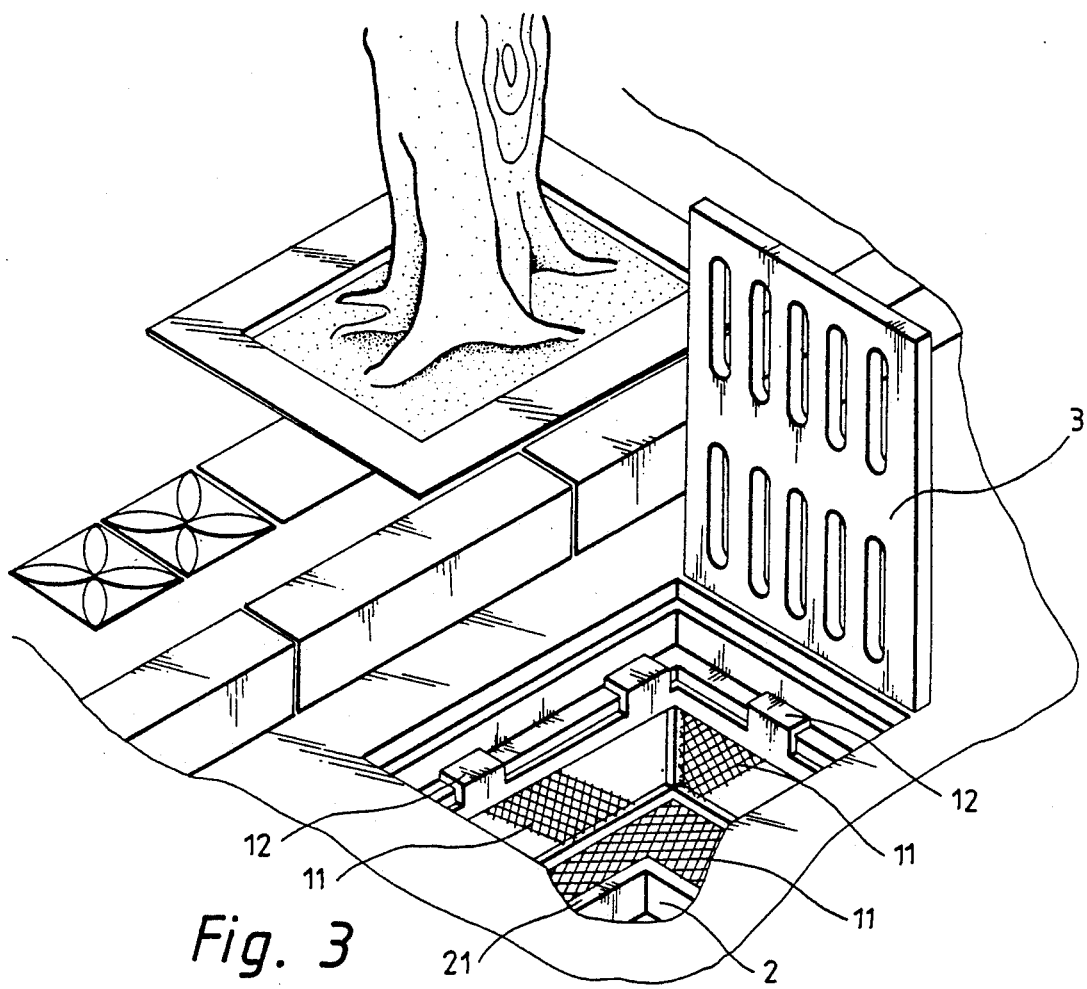
FIG. 3 illustration installation of the refuse collecting frame for a drainage sewer according to the present invention.

The frame body (1) is a rectangular or cubic frame structure having a dimension corresponding to an opening of a drainage sewer. Each lateral side and bottom of the frame body (1) is completed with a filtering net (11) or formed with a porous board (11') having a plurality of penetrating holes. The frame body (1) has an open upper side, and has a plurality of right-angled hangers (12) at appropriate, spaced positions about its upper edges. A hole of appropriate size is formed at the middle of the filtering net (11) or the porous board (11') at the bottom of the frame body (1) for placing of the collecting basin (2) having its edge (21) supported about the outer circumference of the hole. With such a design, as shown in FIG. 3, the frame body (1) can be firmly placed on a sewer opening by hanging the right-angled hangers (12) on a stepped portion along edges of the sewer opening beneath each sewer cover (3).

Figure 4:
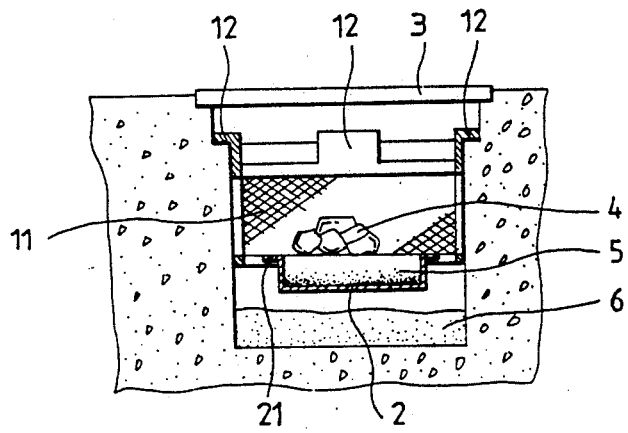
FIG. 4 is a sectional view of the refuse collecting frame for sewer according to the present invention.

As shown in FIG. 4, when the present invention is hung at the edges of a drainage sewer opening beneath the sewer cover (3), larger refuse (4) or gravel (5) can be first filtered out by the sewer cover (3), and that passing through the sewer cover (3) are stopped by the filtering net (11) or porous board (11'), while small refuses and gravels are collected by the collecting basin (2). Therefore, only very tiny particles can enter the sewer, and such tiny particles would not accumulate or cause blockage of to the sewer for they can be brought away by waste water (6). Moreover, the refuse collecting frame according to the present invention can be removed from the sewer opening for cleaning and removal of refuse (4) and gravel (5) collected to prevent from blockage.

Figure 5:
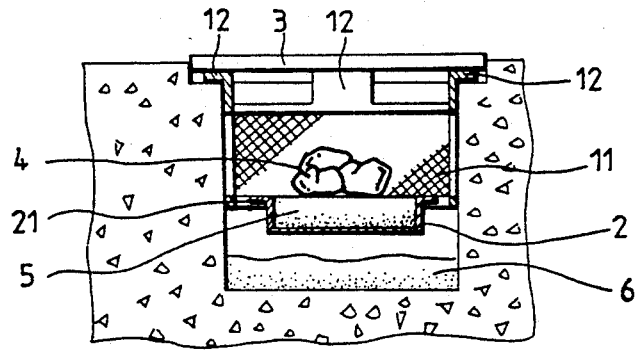
FIG. 5 is a section view of the other embodiment of the refuse collecting frame for a drainage sewer according to the present invention.

As shown in FIG. 5, if there is no stepped portion beneath the sewer cover (3) but there are stepped portions for installation of the sewer cover (3) on the sewer opening, the frame body (1) can be firmly placed on the sewer opening by hanging the right-angled hangers (12) on the stepped portion of the sewer opening.

I claim:

1. A refuse collecting frame adapted to be placed in a drainage sewer having an opening provided with stepped portions along its edges comprising:

a frame body having lateral sides, a bottom and an open top, said lateral sides having an upper edge, adjacent said open top;

a plurality of hangers extending from the upper edge of said lateral sides, said plurality of hangers being adapted to engage said stepped portions provided along edges of an opening of a drainage sewer and thereby supporting said frame body therefrom;

porous refuse filtering means formed at the lateral sides and bottom of said frame body, said porous refuse filtering means being formed with a hole substantially, centrally located in the bottom of said frame body; and an imperforate collecting basin having a rimmed upper edge, said refuse collecting basin being received in the hole located in the bottom of said frame body with said rimmed upper edge of said refuse collecting basin being seated upon a first portion of said porous refuse filtering means located on the bottom of said frame with a second portion of said porous refuse filtering means extending from said rimmed upper edge to the lateral sides.

2. The refuse collecting frame of claim 1, wherein said plurality of hangers are spaced about the upper edge of said lateral sides.

3. The refuse collecting frame of claim 2, wherein at least a portion of each of said plurality of hangers extends substantially perpendicular to said lateral sides.

4. The refuse collecting frame of claim 1, wherein said porous refuse filtering means comprises a filtering net.

5. The refuse collecting frame of claim 1, wherein said porous refuse filtering means comprises at least one board having a plurality of penetrating holes formed therein.

6. The refuse collecting frame of claim 1, wherein the frame body has a rectangular prism or cubic frame structure.

* * * * *